(No Model.) 2 Sheets—Sheet 1.
S. BERGMANN.
TELEPHONE.
No. 443,493. Patented Dec. 30, 1890.
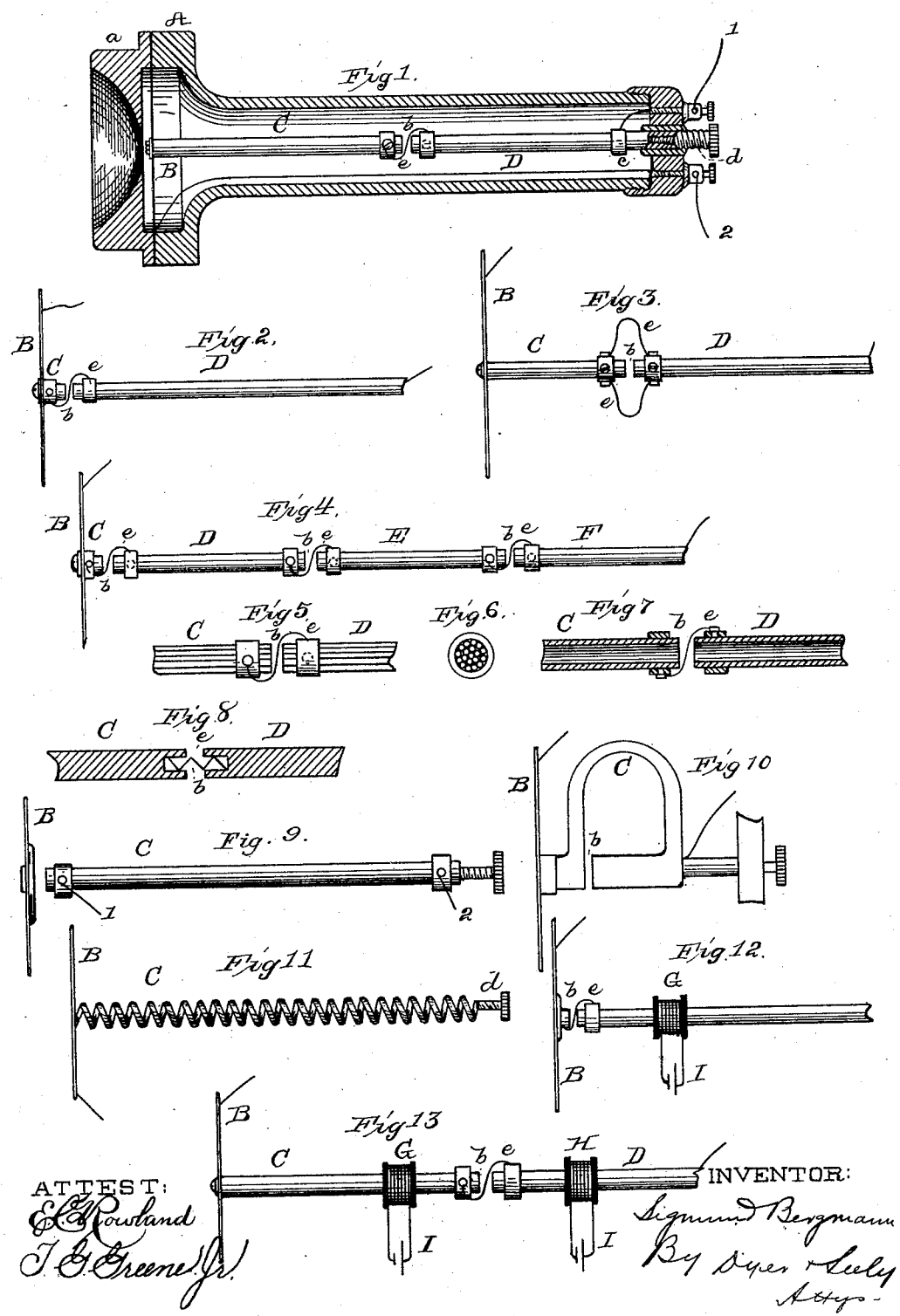

(No Model.) 2 Sheets—Sheet 2.
S. BERGMANN.
TELEPHONE.
No. 443,493. Patented Dec. 30, 1890.
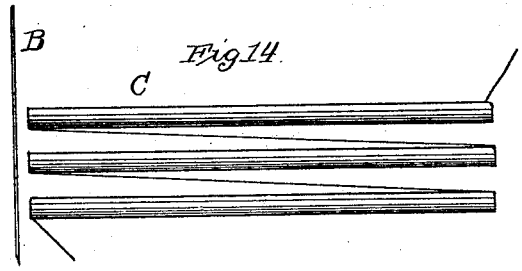
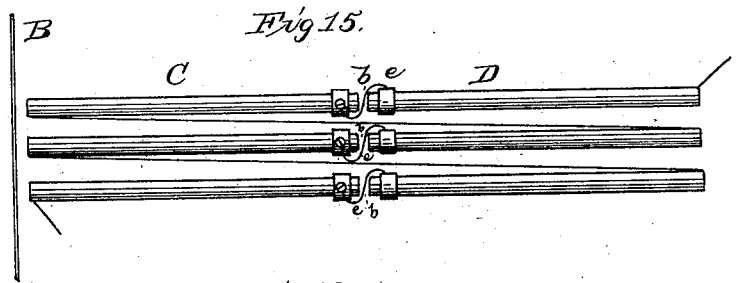
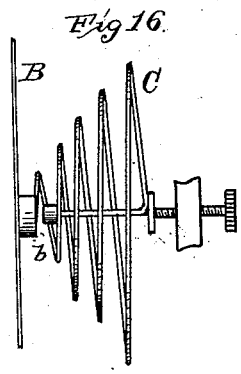
ATTEST:
E. E. Rowland
J. G. Greene Jr.
INVENTOR:
Sigmund Bergmann
By Dyer & Seely
Attys.

UNITED STATES PATENT OFFICE.

SIGMUND BERGMANN, OF NEW YORK, N. Y., ASSIGNOR TO EDWARD H. JOHNSON, OF SAME PLACE.

TELEPHONE.

SPECIFICATION forming part of Letters Patent No. 443,493, dated December 30, 1890.

Application filed December 31, 1884. Serial No. 151,618. (No model.)

*To all whom it may concern:*

Be it known that I, SIGMUND BERGMANN, of New York city, in the county and State of New York, have invented a certain new and useful Improvement in Telephones, of which the following is a specification.

My invention relates to a novel method of varying the force of a magnet, either a permanent or electro-magnet, and to the application of this method for the reception of telephone-current vibrations and their translation into articulated speech. I have discovered that by passing a current of electricity axially through a magnet its attractive force is varied, and that this variation is sufficient, when the parts are properly arranged, to permit the application of the principle to a telephone-receiver. My theory of the action is that the molecules of the magnet tend to set themselves at right angles to the flowing current, and that this results in a diminution of the magnetism in proportion to the strength of the current, and hence that the magnetism will vary, as does the current passing through the magnet; but I may be in error as to the cause and nature of the action and do not bind myself to this theory. I have obtained the best results by arranging two or more magnets in line, with their ends in close proximity, such ends being connected by suitable conductors of the current. The magnets are connected in circuit, the current passing through them from end to end, or from center to ends, or ends to center, in both directions. For a telephone-receiver the diaphragm, piston, or other suitable sound-producing body may carry one of the magnets or have a soft-iron armature attached thereto, if it is of mica or other insulating material, or the diaphragm may itself be of soft iron and act as an armature or carry one of the magnets. A single magnet may be used, in which case the diaphragm can be arranged as an armature opposite the end of the magnet, or, if of insulation, have an armature attached to it and arranged opposite the end of the magnet, or if a construction is employed which permits of movement of the diaphragm by variations in the force of the magnet such diaphragm may be connected directly to the magnet.

In a telephone-receiver as well as in other applications of the principle an adjusting device will be employed, which may be a contrivance for moving the magnet to vary the distance at the attracting point or points.

The invention is illustrated in the accompanying drawings in one of its applications—namely, that of telephones.

Figure 1 is a sectional view of a telephone-receiver embodying the invention; and Figs. 2 to 16, inclusive, views of parts of the telephone-receiver, showing modified forms of the instrument.

In Fig. 1, A is the case, having mouth-piece $a$ and diagram B. C D are two magnetized steel bars. These bars are arranged in line with their adjoining ends in close proximity, leaving a space $b$ for mechanical movement between them. One bar is attached to the diaphragm, and the other is supported by a sleeve $c$, which is adjusted from the end of the case by a screw $d$, so as to increase or decrease the attractive space $b$. The adjoining ends of the magnet-bars C D are connected by a conductor $e$, suitably arranged to permit free movement longitudinally of the bars. The binding-posts or circuit-connections 1 2 are connected one with the outer end of bar D through adjusting-sleeve $c$ and the other with the outer end of bar C through the diaphragm. If the diaphragm is made of insulation the circuit-connection from 2 will run to its center, where the bar C is secured thereto. The current of the circuit flows from 1 through magnet-bar D, conductor $e$, magnet-bar C, and diaphragm to 2, or in the reverse direction. The effect is to vibrate the diaphragm and translate the telephone-current vibrations into articulate speech. The effect is modified by adjusting the screw $d$ and varying space $b$.

In Fig. 2 the magnet C is shown as quite short. This short magnet may be a soft-iron armature, or be omitted if the diaphragm is of iron, and the current may still be conducted across space $b$.

In Fig. 3 the conductor $e$, which is shown in Fig. 1 as a spiral, is shown as composed of outwardly-bent pieces.

In Fig. 4 four magnets C D E F are shown.

These may be mounted in a tube to keep them in line, or be otherwise suitably supported.

In Figs. 5 and 6 the magnet-bars C D are shown as of a number of steel wires bunched together, while in Fig. 7 such bars are shown as tubular.

In Fig. 8 the bars C D are shown as bored out at adjoining ends, and the conductor e rests within the bored ends.

In Fig. 9 one magnet-bar C is used, the circuit-connections 1 2 being made with opposite ends. The diaphragm has an armature, which, however, is not necessary if the diaphragm is of iron. The current does not pass to the diaphragm or the armature carried by it, which is a construction that may be used when more than one magnet is employed.

In Fig. 10 a horseshoe or U magnet C is employed. The diaphragm is supported upon one pole, and the other pole is brought close to the first, leaving the space b for mechanical action. No conductor across space b is used; but the current passes around through the back of the magnet. The back of the magnet is made thin and elastic, so that the adjustment provided for can be made.

In Fig. 11 the magnet C is a steel spring magnetized. One end of the spring is connected directly to the diaphragm. The other end runs to an adjusting-sleeve and screw d. The current acts upon this spring-magnet similar to the bar-magnet; but the spring permitting mechanical movement, it can be attached directly to the diaphragm.

In Figs. 12 and 13 are shown spools G H in circuit with local batteries I to produce the magnetization if the bars are of soft iron, or to better maintain it if the bars are of steel.

In Fig. 14 a number of magnet-poles are shown as presented to the diaphragm, each being the end of a single magnet. In Fig. 15 double magnets are shown. In either case the magnet-poles facing the diaphragm will preferably be arranged in a circle around the center of the diaphragm.

In Fig. 16 the magnet is a conical spring with one end secured to the diaphragm and the other end carried through its center, so that the poles will be close together. This is like Fig. 10, with the back of the magnet thrown into a conical spring. Where two or more magnets are used, I find I get the best effects if opposite polarities are brought together, although the instrument works when the same polarities are in proximity. The conductors e may be springs which oppose the pressure of the adjusting-screw, and they may be made of steel and polarized, although this is not necessary.

I do not claim herein the mechanical constructions shown, since such constructions are covered by an application of even date herewith upon telephone-receivers, and I wish it understood that my invention, so far as it relates to the method set forth and claimed herein, is not limited to such constructions.

What I claim is—

1. The method of reproducing sound from telephone-current vibrations, consisting in passing the electric current axially through a magnet, thereby varying its force in conformity with the current changes and moving a sound-producing body by the varying force of such magnet, substantially as set forth.

2. The method of reproducing articulate speech from telephone-current vibrations, consisting in passing the electric current axially through a magnet, thereby varying its force in conformity with the current changes and moving a sound-producing body by the varying force of such magnet, substantially as set forth.

This specification signed and witnessed this 11th day of December, 1884.

SIGMUND BERGMANN.

Witnesses:
WM. H. MEADOWCROFT,
THOS. G. GREENE, Jr.